US011776277B2

(12) United States Patent
Hashimoto

(10) Patent No.: US 11,776,277 B2
(45) Date of Patent: Oct. 3, 2023

(54) APPARATUS, METHOD, AND COMPUTER PROGRAM FOR IDENTIFYING STATE OF OBJECT, AND CONTROLLER

(71) Applicant: TOYOTA JIDOSHA KABUSHIKI KAISHA, Toyota (JP)

(72) Inventor: Daisuke Hashimoto, Chofu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 278 days.

(21) Appl. No.: 17/208,466

(22) Filed: Mar. 22, 2021

(65) Prior Publication Data
US 2021/0295058 A1    Sep. 23, 2021

(30) Foreign Application Priority Data

Mar. 23, 2020    (JP) ................................. 2020-051751

(51) Int. Cl.
*G06V 10/00*    (2022.01)
*G06V 20/56*    (2022.01)
(Continued)

(52) U.S. Cl.
CPC ......... *G06V 20/56* (2022.01); *B60W 30/0956* (2013.01); *G06F 18/211* (2023.01);
(Continued)

(58) Field of Classification Search
CPC ...... G06V 20/56; G06V 10/25; G06V 10/771; G06V 10/809; G06V 10/764;
(Continued)

(56) References Cited

U.S. PATENT DOCUMENTS

2007/0097209 A1    5/2007 Kubota
2014/0055615 A1    2/2014 Chen
(Continued)

FOREIGN PATENT DOCUMENTS

DE    11 2007 001 501 T5    6/2009
JP    6-255399 A    9/1994
(Continued)

OTHER PUBLICATIONS

Daisuke Hashimoto et al., U.S. Appl. No. 17/218,348, filed Mar. 31, 2021.

(Continued)

*Primary Examiner* — Tyler J Lee
*Assistant Examiner* — Tiffany P Ohman
(74) *Attorney, Agent, or Firm* — Sughrue Mion, PLLC

(57) ABSTRACT

An apparatus for identifying the state of an object inputs time series images into a first classifier to detect an object region including a predetermined object from each image, determines whether the region of each image is in a mixed state in which the region includes another object other than the object, chronologically inputs characteristics obtained from pixel values of the region of each image into a second classifier having a recursive structure, and applies a recursively used internal state of the second classifier stored in a memory to the second classifier, identifying the state of the object involving time-varying changes in outward appearance. The apparatus rejects the latest internal state when the region of each image is in the mixed state. The apparatus updates the internal state stored in the memory with this latest internal state when the region is not in the mixed state.

7 Claims, 8 Drawing Sheets

(51) Int. Cl.

| | | |
|---|---|---|
| *G06T 7/20* | (2017.01) | |
| *B60W 30/095* | (2012.01) | |
| *G06F 18/24* | (2023.01) | |
| *G06F 18/211* | (2023.01) | |
| *G06F 18/25* | (2023.01) | |
| *G06V 10/25* | (2022.01) | |
| *G06V 10/764* | (2022.01) | |
| *G06V 10/771* | (2022.01) | |
| *G06V 10/80* | (2022.01) | |

(52) U.S. Cl.
CPC ............ *G06F 18/24* (2023.01); *G06F 18/254* (2023.01); *G06T 7/20* (2013.01); *G06V 10/25* (2022.01); *G06V 10/764* (2022.01); *G06V 10/771* (2022.01); *G06V 10/809* (2022.01); *B60W 2420/42* (2013.01); *B60W 2554/4041* (2020.02); *B60W 2554/801* (2020.02); *B60W 2554/802* (2020.02); *G06T 2207/30241* (2013.01); *G06T 2207/30252* (2013.01); *G06V 2201/07* (2022.01); *G06V 2201/08* (2022.01)

(58) Field of Classification Search
CPC ............ G06V 2201/07; G06V 2201/08; G06F 18/254; G06F 18/211; G06F 18/24; B60W 30/0956; B60W 2554/4041; B60W 2554/802; B60W 2554/801; B60W 2420/42; G06T 7/20; G06T 2207/30241; G06T 2207/30252
USPC .......................................................... 701/26
See application file for complete search history.

(56) References Cited

U.S. PATENT DOCUMENTS

| | | |
|---|---|---|
| 2014/0279707 A1 | 9/2014 | Joshua et al. |
| 2017/0174261 A1 | 6/2017 | Micks et al. |
| 2017/0262750 A1 | 9/2017 | Kozuka et al. |
| 2017/0267178 A1 | 9/2017 | Shiga et al. |
| 2019/0066313 A1 | 2/2019 | Kim et al. |
| 2019/0092318 A1 | 3/2019 | Mei et al. |
| 2019/0113927 A1 | 4/2019 | Englard et al. |
| 2019/0130188 A1* | 5/2019 | Zhou ..................... G06V 10/87 |
| 2019/0130583 A1* | 5/2019 | Chen ..................... G06T 7/194 |
| 2019/0162837 A1 | 5/2019 | Komori |
| 2019/0171912 A1 | 6/2019 | Vallespi-Gonzalez et al. |
| 2019/0179006 A1 | 6/2019 | Baba et al. |
| 2019/0197729 A1 | 6/2019 | Liang et al. |
| 2019/0333381 A1 | 10/2019 | Shalev-Shwartz et al. |
| 2019/0354835 A1 | 11/2019 | Mac et al. |
| 2019/0383626 A1 | 12/2019 | Fowe et al. |
| 2020/0111031 A1 | 4/2020 | Wakim et al. |
| 2020/0134313 A1* | 4/2020 | Endoh .................... G06V 20/00 |
| 2020/0160126 A1 | 5/2020 | Malach et al. |
| 2020/0160704 A1 | 5/2020 | Choi et al. |
| 2020/0184278 A1* | 6/2020 | Zadeh .................... G06N 3/044 |
| 2020/0301429 A1 | 9/2020 | Matsunaga et al. |
| 2020/0346644 A1 | 11/2020 | Schmeichel |
| 2020/0353932 A1 | 11/2020 | Wang et al. |
| 2020/0358863 A1 | 11/2020 | Ichikawa |
| 2021/0042542 A1 | 2/2021 | Littman et al. |
| 2021/0103746 A1 | 4/2021 | Chen et al. |
| 2021/0171025 A1 | 6/2021 | Ishikawa et al. |
| 2021/0174197 A1 | 6/2021 | Georgis |
| 2021/0255304 A1* | 8/2021 | Fontijne ................. G06N 3/045 |
| 2021/0312199 A1 | 10/2021 | Hashimoto et al. |
| 2022/0051413 A1 | 2/2022 | Itsumi et al. |
| 2022/0114807 A1 | 4/2022 | Iancu et al. |
| 2022/0301320 A1 | 9/2022 | Hashimoto et al. |

FOREIGN PATENT DOCUMENTS

| | | |
|---|---|---|
| JP | 2006-151370 A | 6/2006 |
| JP | 2007-124226 A | 5/2007 |
| JP | 2017-162438 A | 9/2017 |
| JP | 2018-026096 A | 2/2018 |
| JP | 2018-026108 A | 2/2018 |
| JP | 2019-70934 A | 5/2019 |
| JP | 2019-096132 A | 6/2019 |
| JP | 2019-109691 A | 7/2019 |
| WO | 2008/004963 A1 | 1/2008 |

OTHER PUBLICATIONS

Daisuke Hashimoto et al., U.S. Appl. No. 17/218,280, filed Mar. 31, 2021.
Office Action dated Nov. 25, 2022 issued by the United States Patent and Trademark Office in U.S. Appl. No. 17/218,348.
Office Action dated Nov. 18, 2022 issued by the United States Patent and Trademark Office in U.S. Appl. No. 17/218,280.
Office Action dated Jun. 16, 2023 issued by the United States Patent and Trademark Office in U.S. Appl. No. 17/218,348.
Cho et al., "Parallelized Architecture of Multiple Classifiers for Face Detection", 2009 20th IEEE International Conference on Application-specific Systems, Architectures and Processors, pp. 75-82 (8 pages total).

* cited by examiner

APPARATUS, METHOD, AND COMPUTER PROGRAM FOR IDENTIFYING STATE OF OBJECT, AND CONTROLLER

FIELD

The present invention relates to an apparatus, a method, and a computer program for identifying the state of an object represented in an image, as well as a controller including such an apparatus to control the travel of a vehicle.

BACKGROUND

Techniques to detect an object indicated by sensor information, such as an image obtained by a camera, have been researched. In recent years, techniques have been proposed that use a method of machine learning, such as a "deep neural network" (hereafter, a "DNN") for detecting an object to improve the accuracy of detection.

To track an object represented in an image, a technique has been proposed that use time series images or features obtained therefrom as inputs into a neural network (e.g., see Japanese Unexamined Patent Publication No. 2018-26108).

For example, Japanese Unexamined Patent Publication No. 2018-26108 discloses an object tracking method in which two or more time series images are inputted into a neural network. In this method, those features of the images which are extracted by the neural network are compared to check whether they have similarity; and based on the result of comparison, identification information and position information about one or more objects, which are depicted in a chronologically later image and match one or more tracking candidate objects depicted in a chronologically earlier image, are outputted as a result of identification. The neural network used therein includes two or more identical structures having zero or more fully-connected layers and one or more convolution layers, and shares parameters among corresponding layers across the identical structures.

SUMMARY

In some cases, the state of a target object for detection is represented by time-varying changes in outward appearance of the object. Unfortunately, the above described techniques merely track a target object for detection, and thus may fail to correctly identify the state of the object represented in an image.

It is an object of the present invention to provide an apparatus that can identify the state of an object represented in an image.

According to an embodiment, an apparatus for identifying the state of an object is provided. The apparatus includes a processor configured to: input time series images into a first classifier that has been trained to detect a predetermined object, thereby detecting, for each of the time series images, an object region including the object in the image; determine whether the object region detected in each of the time series images is in a mixed state in which the object region includes another object other than the object; chronologically input characteristics obtained from pixel values of the object region detected in each of the time series images into a second classifier having a recursive structure; and apply a recursively used internal state of the second classifier to the second classifier, thereby identifying the state of the object involving time-varying changes in outward appearance, the internal state being stored in a memory. For each of the time series images, the processor rejects, when the object region of the image is in the mixed state, the latest internal state updated by inputting the characteristics related to the object region of the image into the second classifier, on the other hand, the processor updates the internal state stored in the memory with the latest internal state when the object region of the image is not in the mixed state.

In the apparatus, preferably, the first classifier has been further trained to calculate a mixing level indicating how likely the object region is to be in the mixed state; every time the processor chronologically inputs one of the time series images into the first classifier, the first classifier calculates the mixing level of the object region of the image; and for each of the time series images, when the mixing level of the object region of the image is not less than a predetermined threshold, the processor determines that the object region of the image is in the mixed state.

Alternatively, for each of the time series images, the processor of the apparatus preferably inputs the characteristics related to the object region of the image into a third classifier that has been trained to calculate a mixing level indicating how likely the object region is to be in the mixed state, thereby calculating the mixing level of the object region of the image, and when the mixing level of the object region of the image is not less than a predetermined threshold, the processor determines that the object region of the image is in the mixed state.

Alternatively, for each of the time series images, the processor of the apparatus preferably calculates a degree of overlap between the object region of the image and another object region including another object detected by the first classifier, and when the degree of overlap is not less than a predetermined threshold, the processor determines that the object region of the image is in the mixed state.

According to another embodiment of the present invention, a controller for controlling travel of a vehicle is provided. The controller includes a memory and a processor. The processor is configured to: input time series images obtained by a camera mounted on the vehicle into a first classifier that has been trained to detect another vehicle, thereby detecting, for each of the time series images, an object region including the other vehicle in the image; determine whether the object region detected in each of the time series images is in a mixed state in which the object region includes another object other than the other vehicle; chronologically input characteristics obtained from pixel values of the object region detected in each of the time series images into a second classifier having a recursive structure; and apply a recursively used internal state of the second classifier to the second classifier, thereby identifying the state of the other vehicle involving time-varying changes in outward appearance, the internal state being stored in the memory. The processor is further configured to: predict a trajectory on which the other vehicle will travel, based on the state of the other vehicle, and determine a trajectory to be traveled of the vehicle, based on the predicted trajectory, so that the vehicle will be separate from the other vehicle more than a predetermined distance; and control the vehicle so that the vehicle will travel along the trajectory to be traveled. For each of the time series images, the processor rejects, when the object region of the image is in the mixed state, the latest internal state updated by inputting the characteristics related to the object region of the image into the second classifier, on the other hand, the processor updates the internal state stored in the memory with the latest internal state when the object region of the image is not in the mixed state.

According to still another embodiment of the present invention, a method for identifying the state of an object is provided. The method includes: inputting time series images into a first classifier that has been trained to detect a predetermined object, thereby detecting, for each of the time series images, an object region including the object in the image; determining whether the object region detected in each of the time series images is in a mixed state in which the object region includes another object other than the object; chronologically inputting characteristics obtained from pixel values of the object region detected in each of the time series images into a second classifier having a recursive structure; and applying a recursively used internal state of the second classifier to the second classifier, thereby identifying the state of the object involving time-varying changes in outward appearance, the internal state being stored in a memory. The method further includes, for each of the time series images, rejecting, when the object region of the image is in the mixed state, the latest internal state updated by inputting the characteristics related to the object region of the image into the second classifier, on the other hand, updating the internal state stored in the memory with the latest internal state when the object region of the image is not in the mixed state.

According to still another embodiment of the present invention, a non-transitory recording medium having recorded thereon a computer program for identifying the state of an object is provided. The program includes commands for causing a computer to execute a process including: inputting time series images into a first classifier that has been trained to detect a predetermined object, thereby detecting, for each of the time series images, an object region including the object in the image; determining whether the object region detected in each of the time series images is in a mixed state in which the object region includes another object other than the object; chronologically inputting characteristics obtained from pixel values of the object region detected in each of the time series images into a second classifier having a recursive structure; and applying a recursively used internal state of the second classifier to the second classifier, thereby identifying the state of the object involving time-varying changes in outward appearance, the internal state being stored in a memory. The process further includes, for each of the time series images, rejecting, when the object region of the image is in the mixed state, the latest internal state updated by inputting the characteristics related to the object region of the image into the second classifier, on the other hand, updating the internal state stored in the memory with the latest internal state when the object region of the image is not in the mixed state.

The apparatus according to the present invention has an advantageous effect that it can identify the state of an object represented in an image.

DESCRIPTION OF EMBODIMENTS

Figure 1:
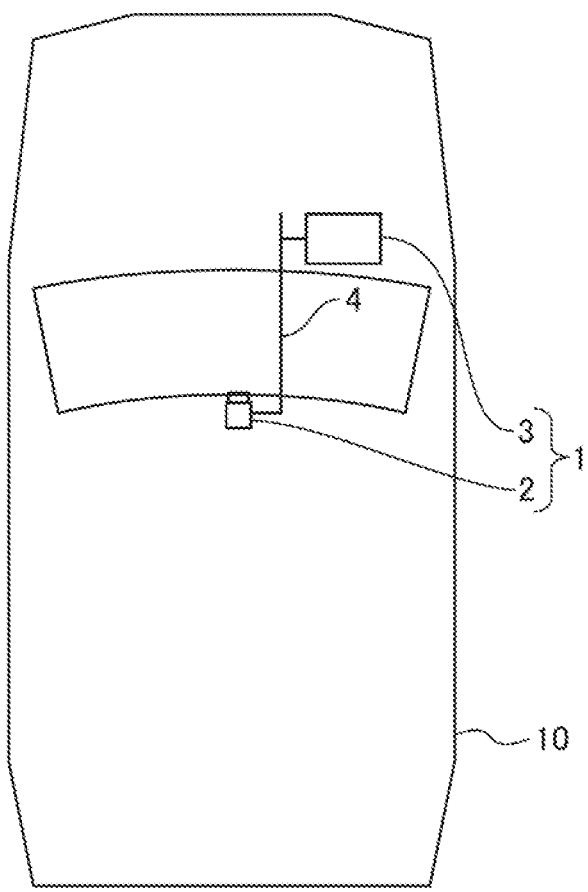
FIG. 1 schematically illustrates the configuration of a vehicle control system including an apparatus for identifying the state of an object.

Hereinafter, an apparatus for identifying the state of an object, a method therefor performed by the apparatus, and a computer program therefor will be described with reference to the accompanying drawings. The apparatus identifies the state, which involves time-varying changes in outward appearance, of a target object for detection (hereafter, a "detection target") represented in time series images. To this end, the apparatus inputs the time series images into a first classifier that has been trained to detect a detection target, thereby detecting, for each image, a region including the detection target (hereafter, an "object region") in the image; the apparatus then obtains, for each object region, a mixing level indicating how likely the object region is to include not only the corresponding detection target but also another object (in particular, another detection target). The apparatus also tracks detection targets detected from the images to associate the object regions representing the same detection target in the images with each other. The apparatus then chronologically inputs characteristics obtained from pixel values of the object regions representing the same detection target in the time series images into a second classifier having a recursive structure, thereby identifying the state of the detection target. For this identification, when the mixing level of the object region of the latest image is not less than a predetermined mixing-level threshold, the apparatus rejects the internal state of the second classifier, which is recursively used and has been updated by inputting the characteristics of the object region of the latest image into the second classifier, and applies an internal state prior to the update at input of the characteristics of the object region of the next image. Thus, even if the object region includes another object other than the detection target of interest, the apparatus can reduce the effect of such an object on the result of identification of the state of the detection target.

For example, assume that the detection target is a vehicle. A vehicle blinks a turn signal light when turning left or right. A vehicle also turns on brake lights when slowing down, and blinks hazard lights during a stop, for example. Turning-on or blinking of a signal light or blinker of a vehicle, such as a turn signal light or a brake light, involves time-varying changes in outward appearance of the vehicle, and represents a state related to the behavior of the vehicle. However, since an individual image representing a turn signal light, a brake light, or a hazard light does not indicate time-varying changes caused by turning on and off of such a light, it is difficult to accurately identify whether a turn signal light or a hazard light is blinking and whether a brake light is on or off, based on an individual image representing such a light. The apparatus can accurately identifies whether a turn signal light or a hazard light is blinking and whether a brake light is on or off, by inputting characteristics obtained from pixel values of object regions of time series images into a second classifier having a recursive structure, as described above.

The following describes an example in which the apparatus for identifying the state of an object is applied to a vehicle control system. In this example, the apparatus performs an object-state identifying process on time series images obtained by a camera mounted on a vehicle, thereby detecting another vehicle near the vehicle as a detection target. The apparatus then identifies the state of the detected vehicle involving changes in outward appearance, i.e., whether its right or left turn signal light or its hazard lights are blinking and whether its brake lights are on or off.

Figure 2:
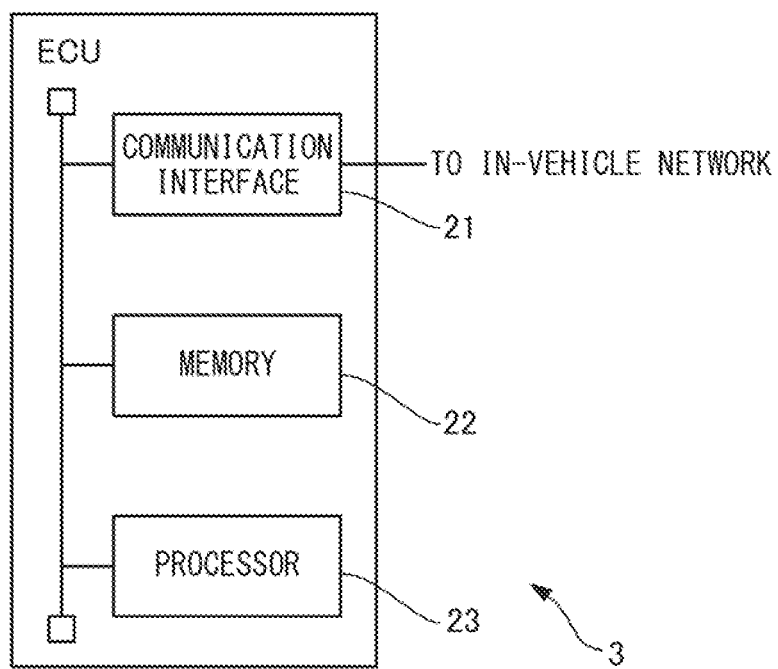
FIG. 2 illustrates the hardware configuration of an electronic control unit, which is an embodiment of the apparatus.

FIG. 1 schematically illustrates the configuration of a vehicle control system including the apparatus for identifying the state of an object. FIG. 2 illustrates the hardware configuration of an electronic control unit, which is an embodiment of the apparatus. In the present embodiment, the vehicle control system 1, which is mounted on a vehicle 10 and controls the vehicle 10, includes a camera 2 for taking a picture of surroundings of the vehicle 10, and an electronic control unit (ECU) 3, which is an example of the apparatus. The camera 2 is connected to the ECU 3 so that they can communicate via an in-vehicle network 4 conforming to a standard, such as a controller area network. The vehicle control system 1 may further include a storage device storing a map used for automated driving control of the vehicle 10. The vehicle control system 1 may further include a range sensor, such as LiDAR or radar; a receiver, such as a GPS receiver, for determining the location of the vehicle 10 in conformity with a satellite positioning system; a wireless communication terminal for wireless communication with another device; and a navigation device for searching for a planned travel route of the vehicle 10.

The camera 2, which is an example of an imaging unit, i.e., a sensor for detecting an object in a predetermined sensing range, includes a two-dimensional detector constructed from an array of optoelectronic transducers, such as CCD or C-MOS, having sensitivity to visible light and a focusing optical system focusing an image of a target region on the two-dimensional detector. The camera 2 is mounted, for example, in the interior of the vehicle 10 so as to be oriented to the front direction of the vehicle 10. The camera 2 takes a picture of a region in front of the vehicle 10 every predetermined capturing period (e.g., 1/30 to 1/10 seconds), and generates images in which the front region is represented. The images obtained by the camera 2 are preferably color images. The vehicle 10 may include multiple cameras taking pictures in different orientations or having different focal lengths.

Every time generating an image, the camera 2 outputs the generated image to the ECU 3 via the in-vehicle network 4.

The ECU 3 controls the vehicle 10. In the present embodiment, the ECU 3 controls the vehicle 10 so as to automatically drive the vehicle 10, depending on an object detected from time series images obtained by the camera 2. To this end, the ECU 3 includes a communication interface 21, a memory 22, and a processor 23.

The communication interface 21, which is an example of a communication unit, includes an interface circuit for connecting the ECU 3 to the in-vehicle network 4. In other words, the communication interface 21 is connected to the camera 2 via the in-vehicle network 4. Every time receiving an image from the camera 2, the communication interface 21 passes the received image to the processor 23.

The memory 22, which is an example of a storing unit, includes, for example, volatile and nonvolatile semiconductor memories. In the case that the processor 23 includes multiple operation units as will be described below, the memory 22 may include dedicated memory circuits for the respective operation units. The memory 22 stores various types of data and various parameters used in the object-state identifying process performed by the processor 23 of the ECU 3, e.g., images received from the camera 2, various parameters for specifying classifiers used in the object-state identifying process, and confidence-score thresholds for respective types of objects. The memory 22 also stores various types of data generated in the object-state identifying process, such as a detected-object list indicating information related to detected objects, for a certain period. The memory 22 may further store information used for travel control of the vehicle 10, such as map information.

The processor 23, which is an example of a control unit, includes one or more central processing units (CPUs) and a peripheral circuit thereof. The processor 23 may further include another arithmetic circuit, such as a logical operation unit, a numerical operation unit, or a graphics processing unit (GPU). Every time receiving an image from the camera 2 during travel of the vehicle 10, the processor 23 performs a vehicle control process including the object-state identifying process on the received image. The processor 23 controls the vehicle 10 so as to automatically drive the vehicle 10, depending on a detected object near the vehicle 10.

Figure 3:
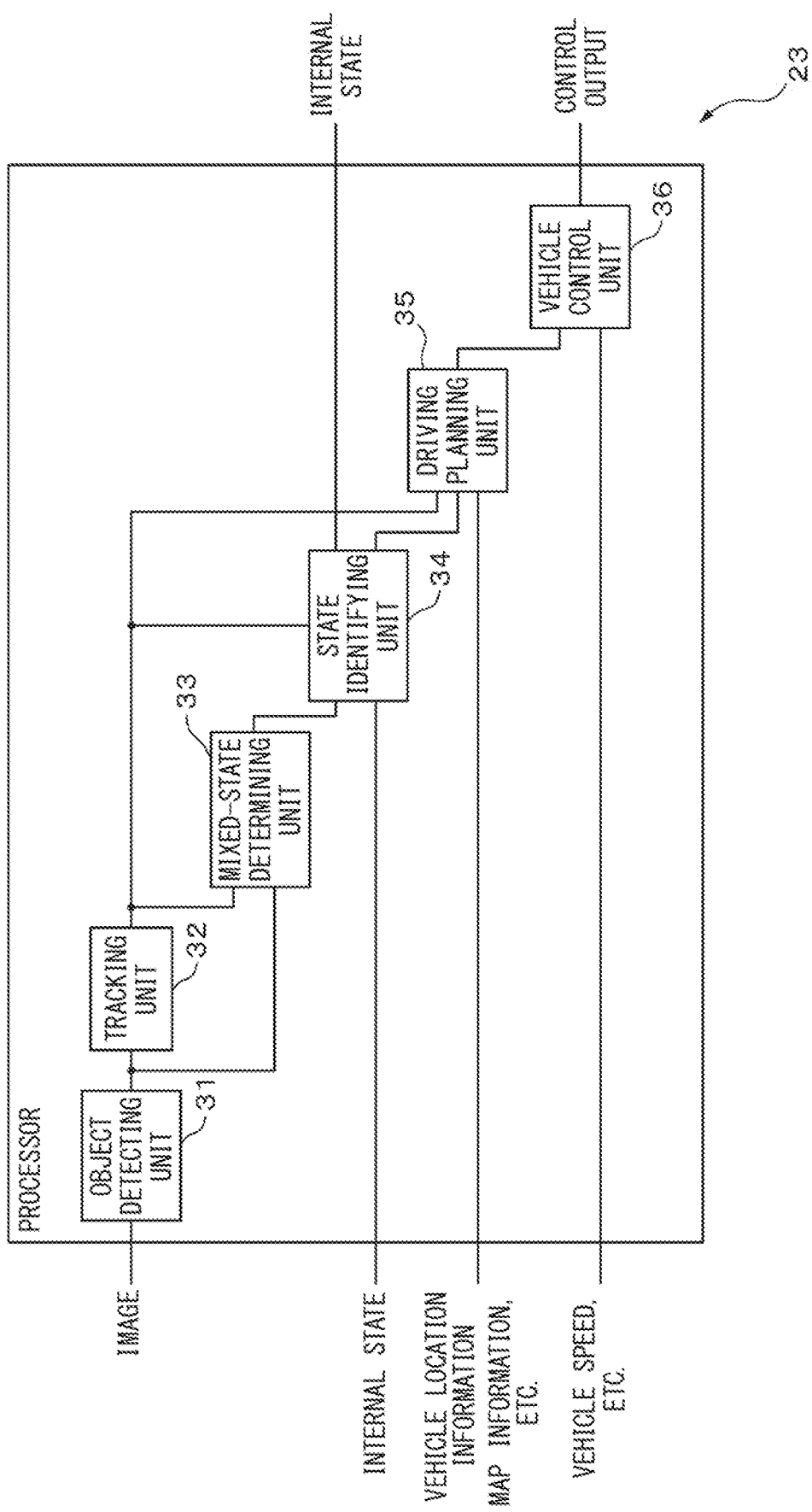
FIG. 3 is a functional block diagram of a processor of the electronic control unit, related to a vehicle control process including an object-state identifying process.

FIG. 3 is a functional block diagram of the processor 23 of the ECU 3, related to the vehicle control process including the object-state identifying process. The processor 23 includes an object detecting unit 31, a tracking unit 32, a mixed-state determining unit 33, a state identifying unit 34, a driving planning unit 35, and a vehicle control unit 36. These units included in the processor 23 are, for example, functional modules implemented by a computer program executed on the processor 23, or may be dedicated arithmetic circuits provided in the processor 23. Out of these units included in the processor 23, the object detecting unit 31, the tracking unit 32, the mixed-state determining unit 33, and the state identifying unit 34 perform the object-state identifying process. In the case that the vehicle 10 includes multiple cameras, the processor 23 may perform, for each camera, the object-state identifying process, based on images obtained by the camera.

Every time receiving an image from the camera 2, the object detecting unit 31 inputs the latest received image into a first classifier for object detection to detect a region (i.e., an object region) including a detection target (i.e., another vehicle) represented in the image and to identify the type of the detection target. For each object region, the object detecting unit 31 also calculates the mixing level of the object region.

In the present embodiment, the object detecting unit 31 uses, as the first classifier, a DNN that has been trained to detect an object region including a detection target represented in an image, to identify the type of the detection target, and to calculate a mixing level. The DNN used by the object detecting unit 31 may be, for example, a DNN having a convolutional neural network (hereafter, "CNN") architecture.

Figure 4:
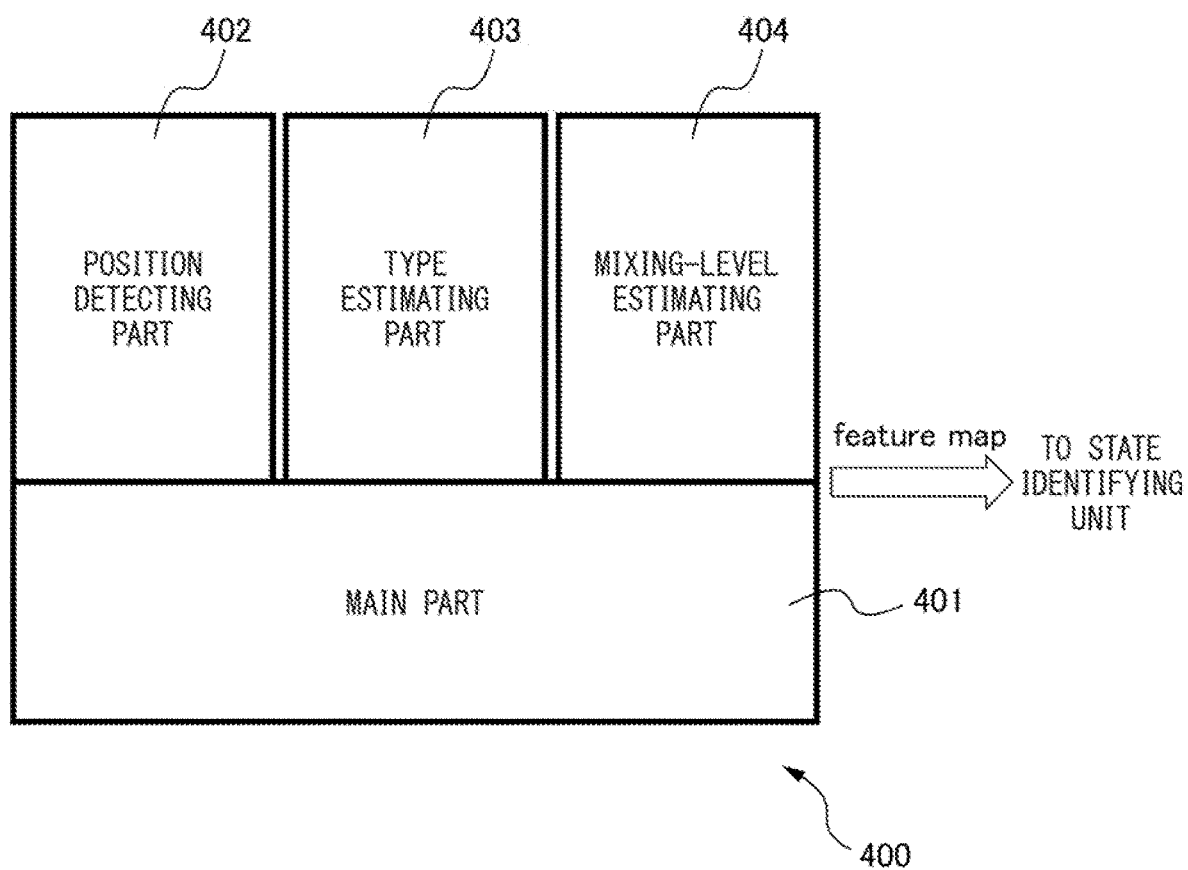
FIG. 4 illustrates an example of the configuration of a DNN used as a first classifier.

FIG. 4 illustrates an example of the configuration of a DNN used as the first classifier. The DNN 400 includes a main part 401, which is provided on the input of images, and a position detecting part 402, a type estimating part 403, and a mixing-level estimating part 404, which are provided closer to the output than the main part 401. The position detecting part 402 outputs, as an object region, the circumscribed rectangle of a detection target represented in an image, depending on the output from the main part 401. The type estimating part 403 calculates confidence scores of respective types of each detection target represented in object regions detected by the position detecting part 402, depending on the output from the main part 401. The mixing-level estimating part 404 then calculates the mixing level of each object region, depending on the output from the main part 401. Two or all of the position detecting part 402, the type estimating part 403, and the mixing-level estimating part 404 may be integrated.

The main part 401 may be, for example, a CNN including multiple layers connected in series from the input toward the output. These multiple layers include two or more convolution layers. The multiple layers of the main part 401 may further include a pooling layer every one or more convolution layers. The multiple layers of the main part 401 may further include one or more fully-connected layers. For example, the main part 401 may have a configuration similar to that of a base layer of a Single Shot MultiBox Detector (SSD). Alternatively, the main part 401 may be configured in accordance with another CNN architecture, such as VGG-19, AlexNet, or Network-In-Network.

Upon input of an image, the main part 401 performs an operation on the image in each layer to output a feature map calculated from the image. The main part 401 may output multiple feature maps of different resolutions. For example, the main part 401 may output a feature map with the same resolution as the inputted image, and one or more feature maps with a resolution lower than the inputted image.

The feature maps outputted from the main part 401 are inputted into the position detecting part 402, the type estimating part 403, and the mixing-level estimating part 404. The position detecting part 402, the type estimating part 403, and the mixing-level estimating part 404 may be, for example, CNNs each including multiple layers connected in series from the input toward the output. In the position detecting part 402, the type estimating part 403, and the mixing-level estimating part 404, the multiple layers of each CNN include two or more convolution layers. In the position detecting part 402, the type estimating part 403, and the mixing-level estimating part 404, the multiple layers of each CNN may include a pooling layer every one or more convolution layers. The convolution layers and the pooling layers may be common to the CNNs of the position detecting part 402, the type estimating part 403, and the mixing-level estimating part 404. Additionally, in the position detecting part 402, the type estimating part 403, and the mixing-level estimating part 404, the multiple layers may include one or more fully-connected layers. In this case, the fully-connected layers are preferably provided closer to the output than the corresponding convolution layers. Additionally, the outputs from the corresponding convolution layers may be directly inputted into the fully-connected layers. The output layer of the type estimating part 403 may be a softmax layer that calculates confidence scores of respective types of detection targets in accordance with a softmax function, or a sigmoid layer that calculates such confidence scores in accordance with a sigmoid function. The output layer of the mixing-level estimating part 404 may be a sigmoid layer that calculates the mixing level of each object region in accordance with a sigmoid function.

The position detecting part 402 and the type estimating part 403 are trained so as to output confidence scores of respective types of detection targets, for example, for each of regions located at various positions in an image and having various sizes and aspect ratios. Thus, upon input of an image, the classifier 400 outputs confidence scores of respective types of detection targets for each of regions located at various positions in the image and having various sizes and aspect ratios. The position detecting part 402 and the type estimating part 403 then detect a region for which the confidence score of a certain type of detection target is not less than a predetermined confidence-score threshold, as an object region representing a detection target of this type.

The mixing-level estimating part 404 is trained so as to output, for example, for each of object regions located at various positions in an image and having various sizes and aspect ratios, a confidence score indicating how likely the object region is to include another object other than a detection target, as a mixing level.

Images (training images) included in training data used for training of the classifier 400 are tagged with, for example, types of detection targets (e.g., passenger vehicles, buses, trucks, and motorcycles) and circumscribed rectangles of the detection targets, which are object regions representing the detection targets. Additionally, each object region of a training image is tagged with whether the object region is in a mixed state, in which the object region includes another object other than the detection target of the object region, or in a non-mixed state, in which the object region does not include another object other than the detection target.

Figure 5:
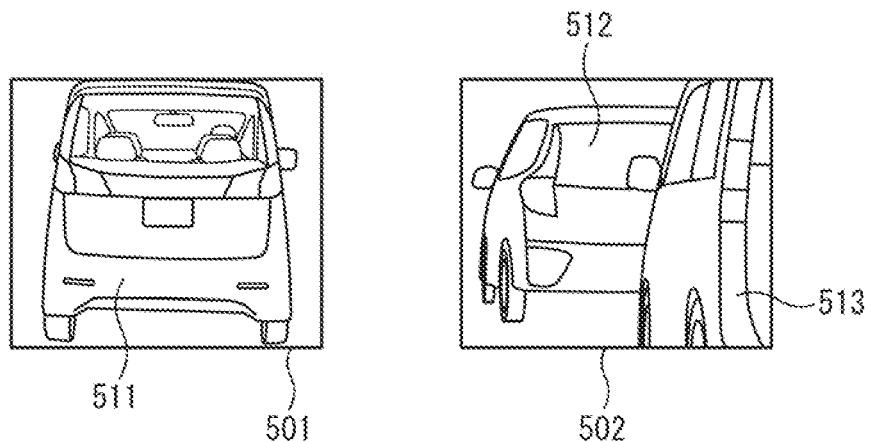
FIG. 5 illustrates an example of a mixed state and a non-mixed state.

FIG. 5 illustrates an example of the mixed state and the non-mixed state. The object region 501 is an example of an object region in the non-mixed state. The object region 501 does not include another object other than a vehicle 511, which is a detection target. This allows for accurately identifying the state of the vehicle 511, based on characteristics obtained from pixel values of the object region 501. The object region 502 is an example of an object region in the mixed state. The object region 502 includes not only a vehicle 512, which is a detection target, but also part of another vehicle 513. Hence, characteristics obtained from pixel values of the object region 502 include not only the characteristics of the vehicle 512 but also those of the other vehicle 513. In particular, since the object region 502 of this example includes a turn signal light and a brake light of the other vehicle 513, turning on or off of the turn signal light or the brake light of the other vehicle 513 affects determination whether the turn signal lights or the brake lights of the vehicle 512 are on or off, for example. For this reason, the use of characteristics obtained from pixel values of the object region 502 for identification of the state of the vehicle 512 may decrease the accuracy of this identification. Note that the other vehicle 513 may also be a detection target; in this case, the first classifier detects the object region of the other vehicle 513.

The classifier 400 is trained with a large number of training images as described above in accordance with a training technique, such as backpropagation. The use of the classifier 400 trained in this way allows the processor 23 to accurately detect, from an image, a target object for detection. The classifier 400 can also accurately calculate a mixing level for each object region.

The object detecting unit 31 may also detect an object that affects travel control of the vehicle 10, other than vehicles near the vehicle 10. Examples of such an object include a human, a signpost, a signal light, a road marking such as a lane division line, and another object on a road. In this case, the first classifier is trained in advance to detect these objects. The object detecting unit 31 can also detect these objects by inputting an image into the first classifier.

The object detecting unit 31 may further perform a non-maximum suppression (NMS) process to select one of object regions that are supposed to represent the same object out of two or more overlapping object regions.

The object detecting unit 31 enters, in a detected-object list, the position and range of each object region in the image, and the type of the object included in the object region. The object detecting unit 31 stores the detected-object list in the memory 22. For each object region, the object detecting unit 31 also stores the feature maps, which are calculated by the main part of the first classifier from the pixels included in the object region and are outputted to the state identifying unit 34, in the memory 22. The feature maps outputted to the state identifying unit 34 may be ones with the same resolution as an image inputted into the first classifier. In the case that, for example, the pooling layer included in the main part of the first classifier calculates a feature map with a resolution lower than an inputted image, this low-resolution feature map may be outputted to the state identifying unit 34. Additionally, the multiple feature maps of different resolutions calculated by the main part of the first classifier may be outputted to the state identifying unit 34.

The object detecting unit 31 also outputs the mixing levels calculated for the respective object regions to the mixed-state determining unit 33.

The tracking unit 32 refers to the detected-object list to associate, for each object region detected from the latest image, the detection target represented in the object region with a detection target detected from a past image, thereby tracking the detection target represented in the object region. Further, when the number of tracked detection targets is greater than a predetermined number (e.g., 5 to 10), the tracking unit 32 selects, out of the tracked detection targets, a predetermined number of detection targets as target objects for state identification.

The tracking unit 32 applies, for example, a tracking process based on optical flow, such as the Lucas-Kanade method, to the object region of interest in the latest image and the object regions in the past images, thereby tracking the detection target represented in the object regions. To this end, the tracking unit 32 applies, for example, a filter for extracting characteristic points, such as a SIFT or Harris operator, to the object region of interest, thereby extracting multiple characteristic points from the object region. Then, the tracking unit 32 may identify those points in the object regions in the past images which correspond to each of the characteristic points in accordance with the applied tracking technique, thereby calculating the optical flow. Alternatively, the tracking unit 32 may apply another tracking technique, which is applied for tracking a moving object detected from images, to the object region of interest in the latest image and the object regions in the past images, thereby tracking the detection target represented in the object regions.

The tracking unit 32 regards a detection target that is detected from the latest image and associated with none of detection targets represented in the past images as a new tracking target, assigns this detection target an identification number different from the identification numbers of the other tracked detection targets, and enters the assigned identification number in the detected-object list. In contrast, the tracking unit 32 associates a detection target that is detected from the latest image and associated with a detection target represented in the past images, i.e., one of the tracked detection targets, with the same identification number as assigned to this tracked detection target.

As described above, when the number of tracked detection targets is greater than a predetermined number, the tracking unit 32 selects, out of the tracked detection targets, a predetermined number of detection targets as target objects for state identification.

For example, since a detection target closer to the vehicle 10 affects driving control of the vehicle 10 more, the tracking unit 32 selects a predetermined number of tracked detection targets in ascending order of distance from the vehicle 10. For example, it is supposed that the larger the object region representing a detection target in an image, the shorter the distance from the vehicle 10 to the detection target. The tracking unit 32 thus selects, for example, a predetermined number of detection targets in descending order of size of object regions in the latest image.

Alternatively, the tracking unit 32 may select a predetermined number of detection targets, based on the positions of bottoms of the object regions of the tracked detection targets in the image. When a detection target is traveling on the same road as the vehicle 10, the position of the bottom of the object region representing the detection target in an image is supposed to be the location of the detection target on the road surface. As a detection target is closer to the vehicle 10, the direction from the camera 2 to the location of the detection target on the road surface is closer to the downward direction, and thus the bottom of the object region in an image is closer to the bottom of the image. Hence it is supposed that the closer to an edge of an image the bottom of an object region, the shorter the distance from the vehicle 10 to the detection target represented in the object region. Thus, the tracking unit 32 may select a predetermined number of tracked detection targets in the latest image in ascending order of distances between the bottoms of object regions and the bottom of the image.

Alternatively, the tracking unit 32 may estimate, for each of the tracked detection targets, the distance from the vehicle 10 to the detection target, based on the ratio of the size (e.g., width) of the object region representing the detection target to a reference size, which is the size of a reference object of the same type as the detection target measured under the assumption that the reference object is located at a predetermined distance from the vehicle 10. Alternatively, in the case that the vehicle control system 1 includes a range sensor (not illustrated), such as LiDAR or radar, the range sensor may measure the distance to each tracked detection target. In this case, for example, the distance in that direction from the range sensor which corresponds to the direction from the camera 2 to the location corresponding to the centroid of an object region representing a detection target in an image is measured as the distance from the vehicle 10 to the detection target. Then, the tracking unit 32 may select a predetermined number of detection targets in ascending order of estimated or measured distance from the vehicle 10.

Alternatively, the tracking unit 32 may select a predetermined number of tracked detection targets lane by lane. For example, the tracking unit 32 selects a detection target supposed to be the closest to the vehicle 10 out of the detection targets traveling on the same lane as the vehicle 10. The tracking unit 32 also selects a detection target supposed to be the closest to the vehicle 10 for each of the two lanes adjoining the traveling lane of the vehicle 10 and the two additional lanes respectively adjoining these adjoining lanes (i.e., the two right and two left lanes with respect to the traveling lane of the vehicle 10). In this case, for example, when the object detecting unit 31 or a localizing processing unit (not illustrated) detects lane division lines from the latest image, the tracking unit 32 may identify the lanes on which the respective detection targets are traveling, based on the positional relationship between the lane division lines and the object regions. For example, the tracking unit 32 may determine that the detection target of interest is on the lane sandwiched between two lane division lines located on the respective sides of the bottom of the object region including the detection target. The tracking unit 32 may perform a process similar to the above selection of detection targets for each lane, thereby selecting the detection target closest to the vehicle 10 out of the detection targets traveling on the lane. The tracking unit 32 may select two or more detection targets in ascending order of distance from the vehicle 10 for each lane.

Figure 6:
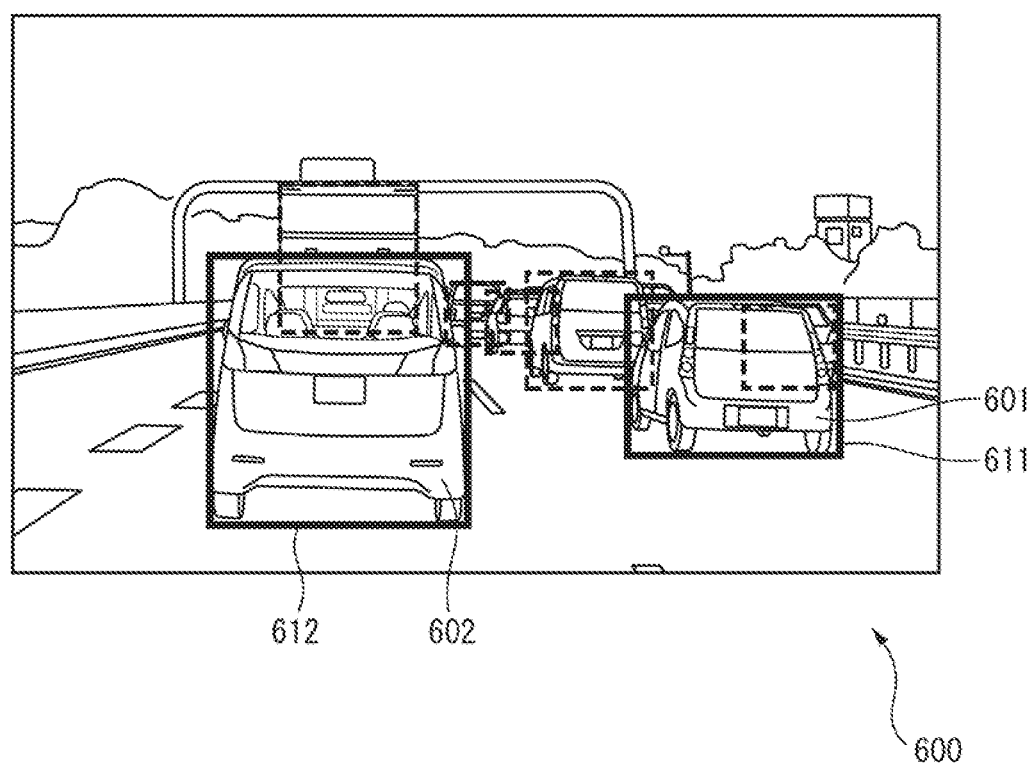
FIG. 6 illustrates an example of selection of target vehicles for state identification.

FIG. 6 illustrates an example of selection of target vehicles for state identification. An image 600 represents several vehicles, which are detected as detection targets. Of the vehicles traveling on the right lane adjoining the traveling lane of the vehicle 10, a vehicle 601 has the largest object region and is supposed to be the closest to the vehicle 10. Thus, the vehicle 601 is selected as a target object for state identification. Characteristics obtained from pixel values of the object region 611 including the vehicle 601 are used for identifying the state of the vehicle 601.

Similarly, of the vehicles traveling on the same lane as the vehicle 10, a vehicle 602 has the largest object region and is supposed to be the closest to the vehicle 10. Thus, the vehicle 602 is selected as a target object for state identification. Characteristics obtained from pixel values of the object region 612 including the vehicle 602 are used for identifying the state of the vehicle 602.

According to a modified example, the tracking unit 32 may select all of the tracked detection targets as target objects for state identification.

The tracking unit 32 notifies the state identifying unit 34 of the identification numbers of the detection targets that are targets for state identification. In addition, the tracking unit 32 updates the values of indices in the detected-object list indicating the detection targets that are targets for state identification, based on results of determination regarding the targets for state identification.

Every time receiving a mixing level of each object region, the mixed-state determining unit 33 determines whether the object region is in the mixed state. For example, the mixed-state determining unit 33 determines that an object region whose mixing level is not less than a predetermined mixing-level threshold is in the mixed state, and that an object region whose mixing level is less than the mixing-level threshold is in the non-mixed state.

The mixed-state determining unit 33 may refer to the detected-object list to identify the object regions respectively including the detection targets that are targets for state identification, and determine, for only each of the identified object regions, whether it is in the mixed state.

The mixed-state determining unit 33 notifies the state identifying unit 34 of the results of determination whether the respective object regions are in the mixed state.

Every time an image is obtained from the camera 2, i.e., for each of the time series images obtained by the camera 2, the state identifying unit 34 inputs characteristics obtained from pixel values of an object region including a detection target into a second classifier having a recursive structure; the state identifying unit 34 performs this input for each of the tracked detection targets that are targets for state identification. In this way, the state identifying unit 34 identifies the state of each detection target involving time-varying changes in outward appearance.

As the characteristics obtained from pixel values of an object region representing a detection target, the state identifying unit 34 may use, for example, features included in the object region of a feature map calculated by the main part of the first classifier. This allows for using not only the characteristics of the detection target but also those of surroundings of the detection target for state identification. In the present embodiment, the second classifier can identify the state of a vehicle that is a detection target, taking account of the effect of the positional relationship between the detection target vehicle and another vehicle, e.g., the situation in which a turn signal light of the detection target vehicle is partially covered by the other vehicle. For example, when the resolution of the feature map is the same as that of an image inputted into the first classifier, the features included in the region of the feature map corresponding to the object region of the inputted image are the characteristics obtained from pixel values of the object region. When the resolution of the feature map is lower than that of an image inputted into the first classifier, the position and range obtained by correcting the coordinates of the object region as a function of the ratio of the resolution of the feature map to that of the inputted image define the region of the feature map corresponding to the object region. For example, assume that the upper left end and the lower right end of the object region of the inputted image are (t1X, t1Y) and (brX, brY), respectively, and that the feature map is calculated by scale-down of the inputted image to 1/N (N is an integer not less than two). In this case, the upper left end and the lower right end of the region of the feature map corresponding to the object region of the inputted image are (t1X/N, t1Y/N) and (brY/N, brY/N), respectively.

According to a modified example, the state identifying unit 34 may use pixel values of an object region representing a detection target in an image inputted into the first classifier as the characteristics that are obtained from pixel values of the object region representing the detection target and are inputted into the second classifier. Alternatively, the state identifying unit 34 may use values obtained by performing a predetermined filtering process, such as a convolution operation, on the pixels of the object region as the characteristics that are obtained from pixel values of the object region representing the detection target and are inputted into the second classifier.

The state identifying unit 34 performs scale transformation, such as downsampling, upsampling, bi-linear interpolation, or bi-cubic interpolation, on the extracted characteristics of each object region to resize them to a predetermined size (e.g., 32 by 32). This allows the second classifier to use the inputted characteristics as constant-size ones even if the relative distance between the vehicle 10 and a detection target changes during tracking of the detection target to result in a change in size of the detection target in an image; thus, the configuration of the second classifier is simplified.

As the second classifier having a recursive structure, the state identifying unit 34 may use, for example, a neural network having a recursive structure, such as a recurrent neural network (RNN), a long short-term memory (LSTM), or a gated recurrent unit (GRU). Since the second classifier is merely required to process characteristics included in an object region, the second classifier includes smaller input and intermediate layers and are defined by fewer parameters, which include weighting factors, than the first classifier. For this reason, the computation amount of the second classifier is less than that of the first classifier, allowing for reducing the computational burden on the processor 23. Further, the computation amount required to train the second classifier is also reduced. In the case that the first classifier and the second classifier are configured as neural networks, these neural networks may be trained together by backpropagation with common training data.

The second classifier, which has a recursive structure, updates its internal state (also referred to as "intermediate state" or "hidden state"), which is recursively used therein, every time characteristics are chronologically inputted. In this way, the second classifier can identify the state of a tracked detection target of interest, based on time-varying changes in its outward appearance. This internal state is stored in the memory 22. Every time characteristics of a tracked detection target of interest are inputted, the second classifier loads the latest internal state of the detection target from the memory 22 and applies it to the operation of the second classifier.

In the present embodiment, the memory 22 stores an internal state updated by inputting, into the second classifier, characteristics obtained from an object region including a tracked detection target of interest at the last determination that the object region is in the non-mixed state for the images sequentially obtained by the camera 2. Thus, when the object region of the tracked detection target of interest in the immediately preceding image is in the non-mixed state, the state identifying unit 34 applies the latest internal state, which is calculated by inputting characteristics obtained from the object region in the immediately preceding image into the second classifier and is stored in the memory 22, to the second classifier, thereby identifying the state of the tracked detection target of interest. When the object region of the tracked detection target of interest in the immediately preceding image is in the mixed state, the state identifying unit 34 applies a past internal state that occurred by inputting, into the second classifier, characteristics obtained from the last object region in the non-mixed state in an image earlier than the immediately preceding image.

In the present embodiment, the state identifying unit 34 identifies the state of a detection target (i.e., another vehicle near the vehicle 10), i.e., whether its right or left turn signal light or its hazard lights are blinking and whether its brake lights are on or off, as described above. To this end, for example, a sigmoid function is used as an activation function of the output layer of the second classifier. This allows the second classifier to output a confidence score of each state. The state identifying unit 34 then compares the confidence score of each state with a corresponding threshold, and determines that the detection target is in the state for which the confidence score is not less than the corresponding threshold. For example, assume that the confidence score of the state in which the left turn signal light of the detection target is blinking is 0.8, and that the confidence score of the state in which it is not blinking is 0.2. Further assume that the threshold is 0.5; then, the state identifying unit 34 determines that the detection target is in the state in which the left turn signal light is blinking.

Alternatively, a softmax function may be used as an activation function of the output layer of the second classifier. In this case, the second classifier outputs, as the state of the detection target, one of the following determination results: the left turn signal light is blinking; the right turn signal light is blinking; the hazard lights are blinking; the brake lights are on; or none of the above. Thus, the state identifying unit 34 may identify the state of the detection target as the state indicated by the determination result outputted from the second classifier.

For each of the detection targets that are targets for state identification, when the object region including the detection target is in the non-mixed state, the state identifying unit 34 writes the result of state identification performed by the second classifier and the updated internal state to the memory 22 to update the result of state identification and the internal state stored in the memory 22, and notifies the driving planning unit 35 of the result.

In contrast, when the object region including the detection target is in the mixed state, the state identifying unit 34 rejects the result of state identification performed by the second classifier and the updated internal state without writing them to the memory 22. The state identifying unit 34 then notifies the driving planning unit 35 of that previous result of state identification for the detection target which is stored in the memory 22.

In this way, since characteristics obtained from an object region in the mixed state are not used for identifying the state of the detection target included in the object region, the state identifying unit 34 can prevent the accuracy of identification of the state of the detection target from decreasing.

Figure 7:
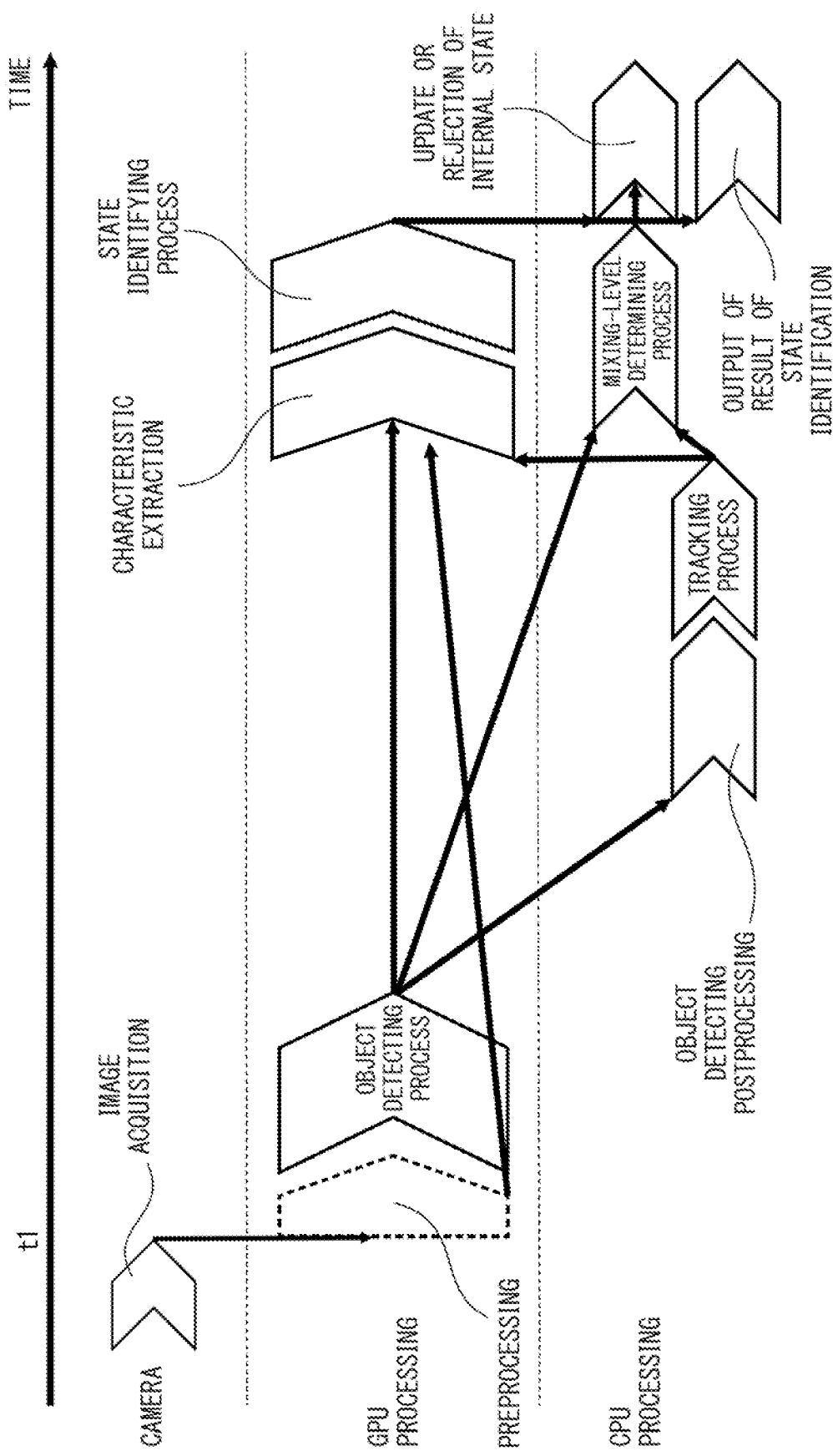
FIG. 7 is a timing chart of processes performed by the units related to a state identifying process.

FIG. 7 is a timing chart of processes performed by the units related to a state identifying process. The processes of the units of the processor 23 are managed, for example, by a scheduler (not illustrated) executed on the processor 23, and are performed in accordance with the timing chart illustrated in FIG. 7. The abscissa of FIG. 7 represents time. In FIG. 7, individual blocks indicate execution of the processes represented in the respective blocks, and individual arrows indicate delivery of data (e.g., images and characteristics) between the processes. For example, when the ECU 3 receives an image from the camera 2 at time t1, the GPU included in the processor 23 performs the detecting process of the object detecting unit 31 on the image for detecting a detection target. Before the detecting process, preprocessing, such as contrast correction or color conversion, may be performed on the image.

After the detecting process, the CPU included in the processor 23 performs postprocessing of object detection, such as entry of the types and the object regions of detected objects into the detected-object list, and thereafter performs the tracking process of the tracking unit 32. After the tracking process, the GPU performs the processes of the state identifying unit 34, i.e., extraction of characteristics to be inputted into the second classifier for the object regions, resizing of the extracted characteristics, and the state identifying process in which the second classifier is used. In parallel with the tracking process or the state identifying process, the determining process is performed for determining whether each object region is in the mixed state. Since the computation amount of the second classifier is relatively small as described above, the state identifying process for each detection target takes only a short computation time. The obtained results of state identification for the detection targets are used for the processes of the driving planning unit 35 and the vehicle control unit 36. Further, processing of update by writing the latest internal state of the second classifier to the memory 22 or rejection of the latest internal state is performed, based on the result of determination whether each object region is in the mixed state. To minimum the cost of task switching between the CPU processing and the GPU processing and the amount of transfer to the memory, it is preferred to perform the process of extraction of characteristics for the detection targets, the state identifying process, and a loading process of results of state identification in a collective manner as batch processing.

Figure 8:
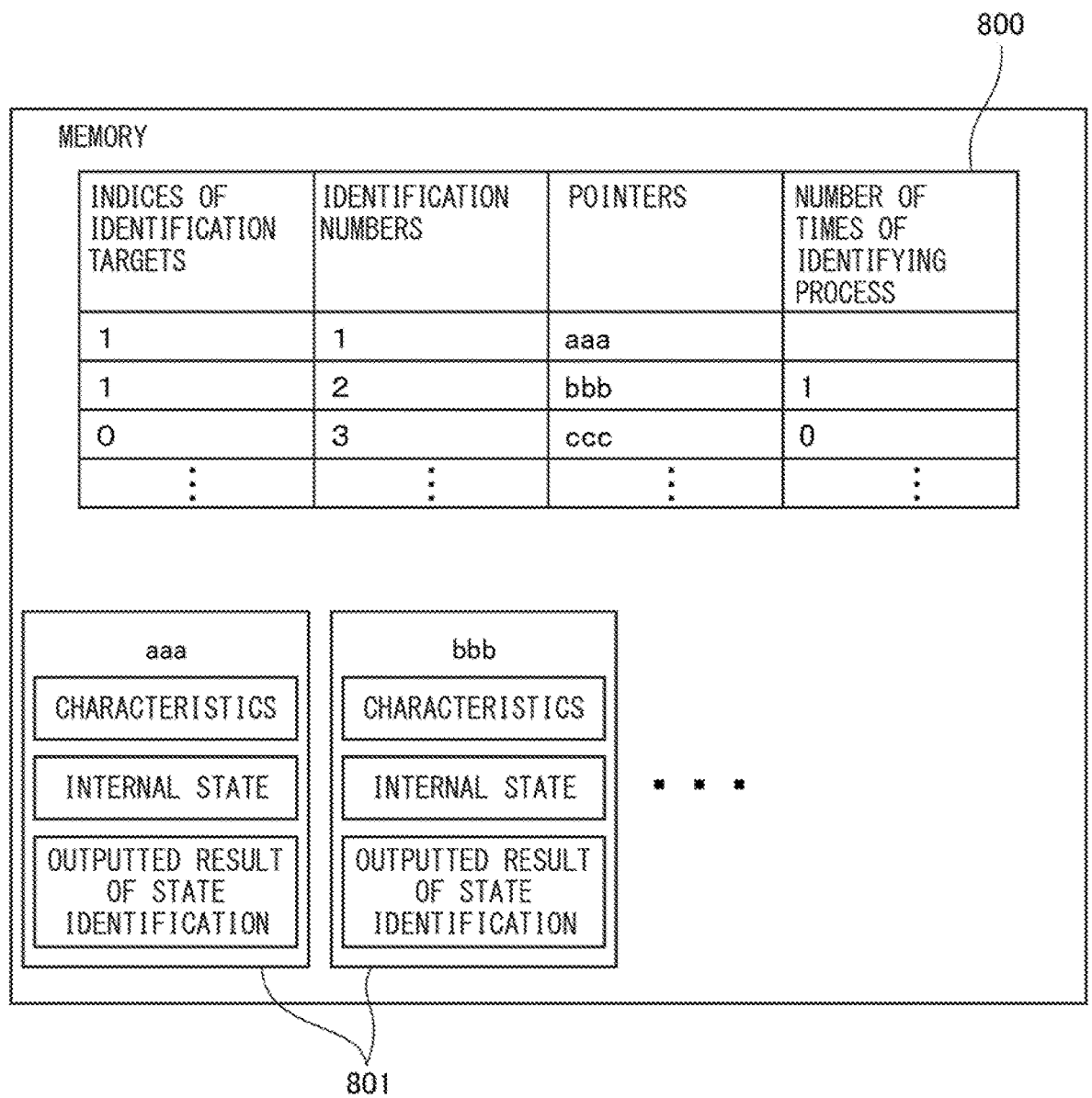
FIG. 8 illustrates an example of a detected-object list.

FIG. 8 illustrates an example of the detected-object list. For each of the tracked detection targets, the detected-object list 800 contains an index indicating whether the detection target is a target for state identification, an identification number assigned to the detection target, a pointer indicating the address of the memory 22 where information related to the detection target is stored, and the number of times of state identification performed by the state identifying unit 34 (i.e., the number of times characteristics obtained from a corresponding object region are inputted into the second classifier). For each of the tracked detection targets, the detected-object list 800 also contains information (not illustrated) indicating the position and range of the object region, information (not illustrated) indicating the type of the detection target, and other information. A storage area 801 in the memory 22 indicated by the pointer for each detection target stores the characteristics inputted into the second classifier for the latest image, the internal state of the second classifier updated last time, the result outputted from the second classifier updated last time, and other data.

The driving planning unit 35 refers to the detected-object list to generate one or more trajectories to be traveled of the vehicle 10 so that the vehicle 10 will not collide with an object near the vehicle 10. Each trajectory to be traveled is represented as, for example, a set of target locations of the vehicle 10 at points in time from the current time to a predetermined time ahead thereof. For example, the driving planning unit 35 refers to the detected-object list to perform viewpoint transformation, using information such as the position at which the camera 2 is mounted on the vehicle 10, thereby transforming the image coordinates of the objects in the detected-object list into coordinates in an overhead image ("overhead-image coordinates"). The driving planning unit 35 then performs a tracking process on sequential overhead-image coordinates, using the Kalman filter, the Particle filter, or another filter, to track the objects entered in the detected-object list, and uses the trajectories obtained from the tracking results to determine predicted trajectories of the respective objects to a predetermined time ahead. The driving planning unit 35 uses the results of state identification for the detection targets to determine the predicted trajectories. For example, when the detection target of interest is in the state that its left turn signal light is blinking, it is highly likely that the detection target will make a lane change to the left or a left turn. For this detection target, the driving planning unit 35 thus determines a predicted trajectory such that it will make a lane change to the left or a left turn. When the detection target of interest is in the state that its brake lights are on or that its hazard lights are blinking, it is highly likely that the detection target will slow down. For this detection target, the driving planning unit 35 thus determines a predicted trajectory such that it will slow down as compare to the present time. When the detection target of interest is in the state that none of the right and left turn signal lights and the hazard lights is blinking and that the brake lights are off, it is highly likely that the detection target will travel straight without slowing down. For this detection target, the driving planning unit 35 thus determines a predicted trajectory such that it will travel straight without slowing down.

The driving planning unit 35 generates a trajectory to be traveled of the vehicle 10, based on the predicted trajectories of the tracked objects, and the location, speed, and orientation of the vehicle 10, so that a predicted distance between the vehicle 10 and any of the tracked objects will be greater than a predetermined distance until a predetermined time ahead. The driving planning unit 35 can estimate the location, speed, and orientation of the vehicle 10, based on, for example, current location information that is obtained from a GPS receiver (not illustrated) mounted on the vehicle 10 and indicates the current location of the vehicle 10. Alternatively, every time an image is obtained by the camera 2, a localizing process unit (not illustrated) may detect lane division lines on the right and left of the vehicle 10 from the image, and compares the detected lane division lines with the map information stored in the memory 22, thereby estimating the location, speed and orientation of the vehicle 10. Additionally, the driving planning unit 35 may refer to, for example, the current location information of the vehicle 10 and the map information stored in the memory 22 to count the number of lanes available for travel by the vehicle 10. When more than one lane is available for travel by the vehicle 10, the driving planning unit 35 may generate a trajectory to be traveled so that the vehicle 10 will make a lane change.

The driving planning unit 35 may generate multiple trajectories to be traveled. In this case, the driving planning unit 35 may select one of the trajectories such that the sum of the absolute values of acceleration of the vehicle 10 is the smallest.

The driving planning unit 35 notifies the vehicle control unit 36 of the generated trajectory to be traveled.

The vehicle control unit 36 controls the components of the vehicle 10 so that the vehicle 10 will travel along the notified trajectory. For example, the vehicle control unit 36 determines the acceleration of the vehicle 10 in accordance with the notified trajectory and the current speed of the vehicle 10 measured by a vehicle speed sensor (not illustrated), and determines the degree of accelerator opening or the amount of braking so that the acceleration of the vehicle 10 will be equal to the determined acceleration. The vehicle control unit 36 then determines the amount of fuel injection in accordance with the determined degree of accelerator opening, and outputs a control signal depending on the amount of fuel injection to a fuel injector of the engine of the vehicle 10. Alternatively, the vehicle control unit 36 outputs a control signal depending on the determined amount of braking to the brake of the vehicle 10.

When the vehicle 10 changes its course in order to travel along the trajectory, the vehicle control unit 36 determines the steering angle of the vehicle 10 in accordance with the trajectory, and outputs a control signal depending on the steering angle to an actuator (not illustrated) controlling the steering wheel of the vehicle 10.

Figure 9:
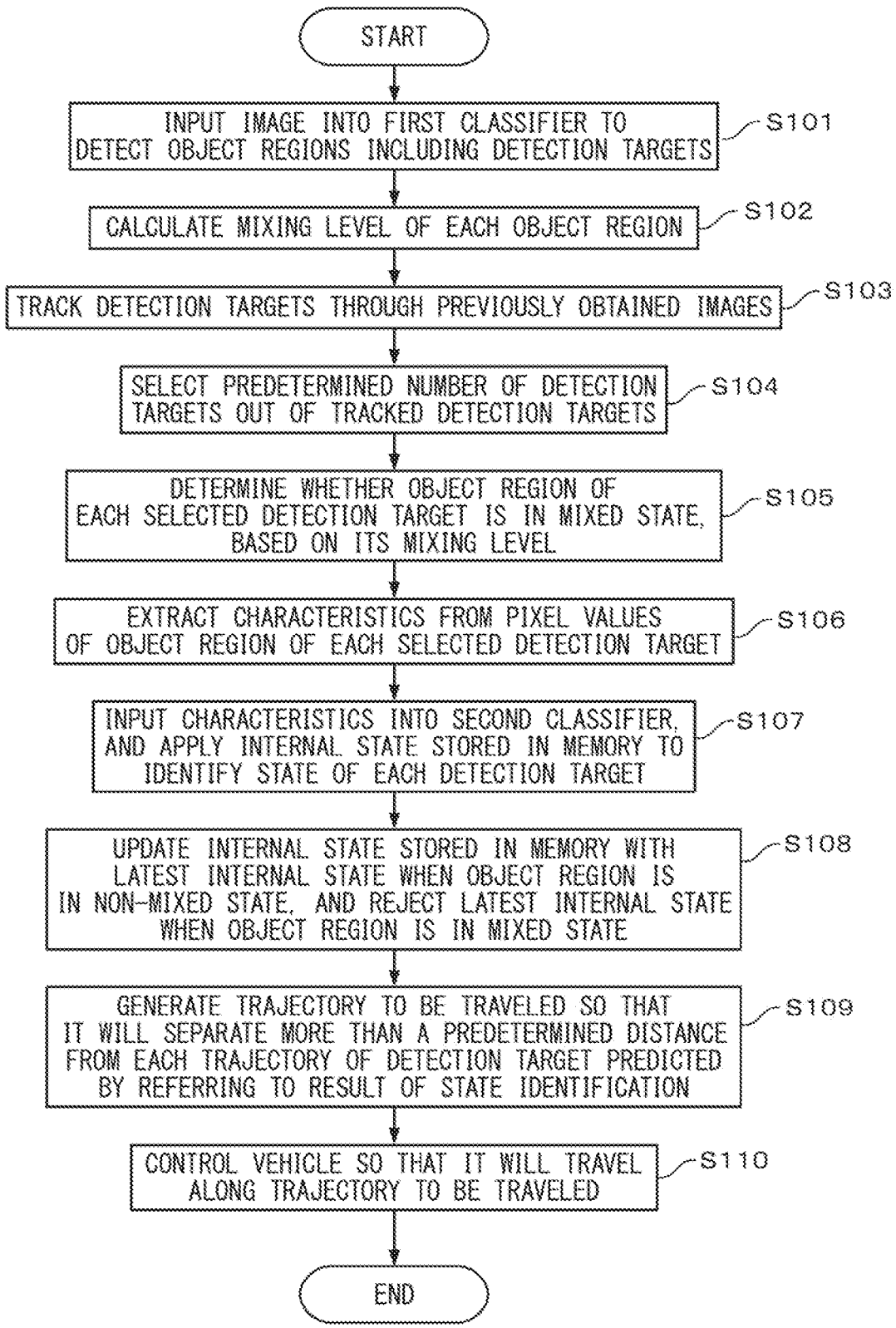
FIG. 9 is an operation flowchart of the vehicle control process including the object-state identifying process.

FIG. 9 is an operation flowchart of the vehicle control process that includes the object-state identifying process and is performed by the processor 23. Every time receiving an image from the camera 2, the processor 23 performs the vehicle control process in accordance with the operation flowchart illustrated in FIG. 9. In the following operation flowchart, the process of steps S101 to S108 corresponds to the object-state identifying process.

The object detecting unit 31 of the processor 23 inputs the latest image obtained from the camera 2 into the first classifier to detect one or more detection targets represented in the image. In other words, the object detecting unit 31 detects one or more object regions including the detection targets in the image (step S101). The object detecting unit 31 also identifies the type of each detected detection target. The object detecting unit 31 then enters the detected detection targets in the detected-object list. The object detecting unit 31 also calculates the mixing level of each detected object region (step S102).

For each of the object regions including the detection targets in the latest image, the tracking unit 32 of the processor 23 tracks the detection target represented in the object region of the latest image, based on this object region and the object regions in the past images (step S103). In addition, the tracking unit 32 selects, out of the tracked detection targets, a predetermined number of detection targets as detection targets that are targets for state identification (step S104).

For each of the selected detection targets, the mixed-state determining unit 33 of the processor 23 determines whether the object region including the detection target is in the mixed state, based on the mixing level of the object region (step S105).

For each of the selected detection targets that are targets for state identification, the state identifying unit 34 of the processor 23 extracts characteristics obtained from pixel values of the object region representing the detection target (step S106). For each of the detection targets that are targets for state identification, the state identifying unit 34 inputs the extracted characteristics into the second classifier having a recursive structure, and applies, to the second classifier, that internal state of the second classifier for the detection target which is stored in the memory 22, thereby identifying the state of the detection target (step S107).

For each of the detection targets that are targets for state identification, when the object region including the detection target is in the non-mixed state, the state identifying unit 34 further updates the internal state stored in the memory 22 with that latest internal state of the second classifier which occurred at identification of the state of the detection target, and writes the result of state identification for the detection target to the memory 22. In contrast, when the object region is in the mixed state, the state identifying unit 34 rejects the latest internal state and the result of state identification (step S108). In other words, the internal state of the second classifier and the result of state identification are not updated.

The driving planning unit 35 of the processor 23 refers to the detected-object list to generate a trajectory to be traveled of the vehicle 10 so that, for each of the detection targets entered in the detected-object list, the trajectory to be traveled will be separate more than a predetermined distance from the predicted trajectory of the detection target determined by referring to the result of state identification (step S109). The vehicle control unit 36 of the processor 23 then controls the vehicle 10 so that the vehicle 10 will travel along the trajectory (step S110). The processor 23 then terminates the vehicle control process.

As has been described above, the apparatus for identifying the state of an object inputs time series images into the first classifier to detect an object region including a detection target from each of the time series images. For each of the time series images, the apparatus also determines whether the object region including the detection target is in the mixed state. The apparatus then chronologically inputs characteristics extracted from the object region into the second classifier having a recursive structure to identify the state of the detection target. When the object region of the latest image is in the non-mixed state, the apparatus further updates the internal state of the second classifier, so that the updated internal state will be applied to the second classifier at input of the characteristics of the object region of the next image into the second classifier. In contrast, when the object region is in the mixed state, the apparatus rejects the internal state of the second classifier, so that the previously stored internal state will be applied to the second classifier at input of the characteristics of the object region of the next image into the second classifier. In this way, the apparatus can sense time-varying changes in outward appearance of a detection target represented in an image as time-varying changes in characteristics used for state identification. Additionally, when the object region includes an object other than the detection target of interest, in particular, another detection target, the apparatus can prevent information on the object from affecting identification of the state of the detection target of interest. For this reason, the apparatus can correctly identify the state of the detection target. Additionally, since it uses the first classifier, which detects an object from an individual image, to extract characteristics to be inputted into the second classifier from each of the time series images, the apparatus can reduce the total computation amount as compared to the case in which the whole image is inputted into a classifier having a recursive structure to identify the state of the object. Images used to train the first classifier may be still images; in contrast, moving images are necessary to train the second classifier, but the size of each image included in the moving images may be smaller than that of the individual image used to train the first classifier. For this reason, the apparatus requires less cost of training the classifiers (e.g., cost incurred to collect and annotate training images), and requires a smaller computation amount and a shorter computation time to train the classifiers.

According to a modified example, the mixed-state determining unit 33 may use a third classifier, which is provided separately from the first classifier and has been trained to determine whether an object region is in the mixed state, to determine whether each object region is in the mixed state. In this case, for example, the mixed-state determining unit 33 inputs, for each object region, characteristics obtained from pixel values of the object region into the third classifier; these characteristics are similar to those inputted into the second classifier. The third classifier then outputs the mixing level of the object region. When the outputted mixing level is not less than a predetermined mixing-level threshold, the mixed-state determining unit 33 may determine that the object region is in the mixed state. When the outputted mixing level is less than the mixing-level threshold, the mixed-state determining unit 33 may determine that the object region is in the non-mixed state.

In this case, the third classifier may be, for example, a DNN having a CNN architecture. The output layer of the third classifier uses a sigmoid function to output a mixing level having a value of 0 to 1. In this modified example, since the first classifier need not calculate the mixing level, the mixing-level estimating part may be omitted. For this reason, the first classifier may be, for example, a DNN, such as an SSD or a Faster R-CNN, which detects an object region from an image and outputs a result of determination of the type of the detection target represented in the object region.

Alternatively, the second classifier used by the state identifying unit 34 may be trained to output the mixing level together with the result of state identification for a detection target. Alternatively, for each object region, the mixed-state determining unit 33 may calculate the degree of overlap between the object region and another object region, e.g., Intersection over Union (IoU) as the mixing level.

When it is determined that an object region is in the mixed state, the state identifying unit 34 may reject characteristics obtained from the object region without input into the second classifier. In this case, since the second classifier does not perform any operation, the state identifying unit 34 need not perform processes such as resizing of the characteristics obtained from the object region in the mixed state. In the case that the state identifying unit 34 itself extracts the characteristics from an object region, the process to extract the characteristics from the object region in the mixed state may be omitted. This further reduces the computation amount of the state identifying unit 34.

According to another modified example, the object detecting unit 31 may use a classifier other than a DNN, to detect a detection target from an image. For example, the object detecting unit 31 may use, as the first classifier, a support vector machine (SVM) that has been trained to output a confidence score indicating how likely a target object for detection is to be represented in a window defined on an image, in response to input of features (e.g., HOG) calculated with respect to the window. The object detecting unit 31 calculates the features with respect to a window defined on an image while variously changing the position, size, and aspect ratio of the window, and inputs the calculated features to the SVM to obtain the confidence score for the window. Then, the object detecting unit 31 may determine that a window for which the confidence score of a certain type of detection target is not less than a predetermined confidence-score threshold represents the detection target, and regard this window as an object region. The SVM may be prepared for each type of target object for detection. In this case, the object detecting unit 31 may input, for each window, the features calculated from the window into the SVMs to calculate the confidence scores for the respective types of objects. In this case, the characteristics of the object region inputted into the third classifier of the state identifying unit 34 may be features, such as HOG, which are extracted from the window (i.e., the object region) representing the detection target and are inputted into the SVM.

The apparatus for identifying the state of an object according to the above embodiment or modified examples may be mounted on a device other than vehicle-mounted equipment. For example, the apparatus according to the above embodiment or modified examples may be configured to detect an object from an image generated by a surveillance camera placed for taking a picture of a predetermined outdoor or indoor region every predetermined cycle and to identify the state of the detected object. In the case that an object has been detected for a certain period, the apparatus may cause a display connected to the apparatus to display a message indicating that an object has been detected and the result of state identification for the object.

A computer program for achieving the functions of the units of the processor 23 of the apparatus according to the above embodiment or modified examples may be provided in a form recorded on a computer-readable and portable medium, such as a semiconductor memory, a magnetic recording medium, or an optical recording medium.

As described above, those skilled in the art may make various modifications according to embodiments within the scope of the present invention.

What is claimed is:

1. An apparatus for identifying a state of an object, the apparatus comprising a processor configured to:
input time series images into a first classifier that has been trained to detect a predetermined object, thereby detecting, for each of the time series images, an object region including the object in the image;
determine whether the object region detected in each of the time series images is in a mixed state in which the object region includes another object other than the object;
chronologically input characteristics obtained from pixel values of the object region detected in each of the time series images into a second classifier having a recursive structure; and
apply a recursively used internal state of the second classifier to the second classifier, thereby identifying the state of the object involving time-varying changes in outward appearance, the recursively used internal state being associated with the second classifier and the recursively used internal state being stored in a memory,
wherein, for each of the time series images, when the object region of the image is not in a mixed state, the recursively used internal state associated with the second classifier is updated to a latest internal state of the second classifier generated by inputting the characteristics related to the object region of the image into the second classifier, and when the object region of the image is in a mixed state, the recursively used internal state associated with the second classifier is updated to a latest internal state of the second classifier generated by inputting the characteristics related to the object region of a previous image among the time series images that was not in a mixed state into the second classifier.

2. The apparatus according to claim 1, wherein:
the first classifier has been further trained to calculate a mixing level indicating how likely the object region is to be in the mixed state;
every time the processor chronologically inputs one of the time series images into the first classifier, the first classifier calculates the mixing level of the object region of the image; and
for each of the time series images, when the mixing level of the object region of the image is not less than a predetermined threshold, the processor determines that the object region of the image is in the mixed state.

3. The apparatus according to claim 1, wherein, for each of the time series images, the processor inputs the characteristics related to the object region of the image into a third classifier that has been trained to calculate a mixing level indicating how likely the object region is to be in the mixed state, thereby calculating the mixing level of the object region of the image, and when the mixing level of the object region of the image is not less than a predetermined threshold, the processor determines that the object region of the image is in the mixed state.

4. The apparatus according to claim 1, wherein, for each of the time series images, the processor calculates a degree of overlap between the object region of the image and another object region including another object detected by the first classifier, and when the degree of overlap is not less than a predetermined threshold, the processor determines that the object region of the image is in the mixed state.

5. A controller for controlling travel of a vehicle, the controller comprising
a memory, and
a processor configured to:
input time series images obtained by a camera mounted on the vehicle into a first classifier that has been trained to detect another vehicle, thereby detecting, for each of the time series images, an object region including the other vehicle in the image;
determine whether the object region detected in each of the time series images is in a mixed state in which the object region includes another object other than the other vehicle;
chronologically input characteristics obtained from pixel values of the object region detected in each of the time series images into a second classifier having a recursive structure;
apply a recursively used internal state of the second classifier to the second classifier, thereby identifying the state of the other vehicle involving time-varying changes in outward appearance, the recursively used internal state being associated with the second classifier and the recursively used internal state being stored in a memory;
predict a trajectory on which the other vehicle will travel, based on the state of the other vehicle;
determine a trajectory to be traveled of by the vehicle, based on the predicted trajectory, so that the vehicle will be separate from the other vehicle more than a predetermined distance; and
control the vehicle so that the vehicle will travel along the trajectory to be traveled,
wherein, for each of the time series images, when the object region of the image is not in a mixed state, the recursively used internal state associated with the second classifier is updated to a latest internal state of the second classifier generated by inputting the characteristics related to the object region of the image into the second classifier, and when the object region of the image is in a mixed state, the recursively used internal state associated with the second classifier is updated to a latest internal state of the second classifier generated by inputting the characteristics related to the object region of a previous image among the time series images that was not in a mixed state into the second classifier.

6. A method for identifying a state of an object, comprising:
inputting time series images into a first classifier that has been trained to detect a predetermined object, thereby detecting, for each of the time series images, an object region including the object in the image;
determining whether the object region detected in each of the time series images is in a mixed state in which the object region includes another object other than the object;
chronologically inputting characteristics obtained from pixel values of the object region detected in each of the time series images into a second classifier having a recursive structure;
applying a recursively used internal state of the second classifier to the second classifier, thereby identifying the state of the object involving time-varying changes in outward appearance, the internal state being stored in a memory, the recursively used internal state being associated with the second classifier and the recursively used internal state being stored in a memory; and,
for each of the time series images, when the object region of the image is not in a mixed state, the recursively used internal state associated with the second classifier is updated to a latest internal state of the second classifier generated by inputting the characteristics related to the object region of the image into the second classifier, and when the object region of the image is in a mixed state, the recursively used internal state associated with the second classifier is updated to a latest internal state of the second classifier generated by inputting the characteristics related to the object region of a previous image among the time series images that was not in a mixed state into the second classifier.

7. A non-transitory recording medium having recorded thereon a computer program for identifying a state of an object, the program causing a computer to execute a process comprising:
inputting time series images into a first classifier that has been trained to detect a predetermined object, thereby detecting, for each of the time series images, an object region including the object in the image;
determining whether the object region detected in each of the time series images is in a mixed state in which the object region includes another object other than the object;
chronologically inputting characteristics obtained from pixel values of the object region detected in each of the time series images into a second classifier having a recursive structure;
applying a recursively used internal state of the second classifier to the second classifier, thereby identifying the state of the object involving time-varying changes in outward appearance, the internal state being stored in a memory, the recursively used internal state being associated with the second classifier and the recursively used internal state being stored in a memory; and,
for each of the time series images, when the object region of the image is not in a mixed state, the recursively used internal state associated with the second classifier is updated to a latest internal state of the second classifier generated by inputting the characteristics related to the object region of the image into the second classifier, and when the object region of the image is in a mixed state, the recursively used internal state associated with the second classifier is updated to a latest internal state of the second classifier generated by inputting the characteristics related to the object region of a previous image among the time series images that was not in a mixed state into the second classifier.

\* \* \* \* \*